(12) United States Patent
Cai et al.

(10) Patent No.: US 8,672,211 B2
(45) Date of Patent: Mar. 18, 2014

(54) VIBRATION WELDING SYSTEM WITH THIN FILM SENSOR

(75) Inventors: Wayne W. Cai, Troy, MI (US); Jeffrey A. Abell, Rochester Hills, MI (US); Xiaochun Li, Madison, WI (US); Hang Li, Madison, WI (US); Hongseok Choi, Madison, WI (US); Jingzhou Zhao, Madison, WI (US)

(73) Assignees: GM Global Technology Operations LLC, Detroit, MI (US); Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 13/474,891

(22) Filed: May 18, 2012

(65) Prior Publication Data

US 2013/0306216 A1  Nov. 21, 2013

(51) Int. Cl.
*B23K 31/02* (2006.01)
*B23K 20/10* (2006.01)
*B29C 65/08* (2006.01)

(52) U.S. Cl.
USPC ......... 228/103; 228/110.1; 228/1.1; 228/111; 228/101; 228/102; 156/73.1; 156/580.1

(58) Field of Classification Search
USPC ............... 228/110.1, 1.1, 111, 101, 102, 103; 156/73.1, 580.1
See application file for complete search history.

(56) References Cited

U.S. PATENT DOCUMENTS

| | | | |
|---|---|---|---|
| 3,377,208 A * | 4/1968 | Webb | 136/230 |
| 7,840,101 B2 | 11/2010 | Wong et al. | |
| 2003/0116608 A1 * | 6/2003 | Litwinski | 228/112.1 |
| 2004/0136434 A1 * | 7/2004 | Langley | 374/29 |
| 2009/0269002 A1 * | 10/2009 | Wong et al. | 385/12 |
| 2010/0083801 A1 | 4/2010 | Li et al. | |
| 2011/0108181 A1 * | 5/2011 | Cai et al. | 156/64 |

* cited by examiner

*Primary Examiner* — Erin Saad
(74) *Attorney, Agent, or Firm* — Quinn Law Group, PLLC

(57) ABSTRACT

A vibration welding system includes an anvil, a welding horn, a thin film sensor, and a process controller. The anvil and horn include working surfaces that contact a work piece during the welding process. The sensor measures a control value at the working surface. The measured control value is transmitted to the controller, which controls the system in part using the measured control value. The thin film sensor may include a plurality of thermopiles and thermocouples which collectively measure temperature and heat flux at the working surface. A method includes providing a welder device with a slot adjacent to a working surface of the welder device, inserting the thin film sensor into the slot, and using the sensor to measure a control value at the working surface. A process controller then controls the vibration welding system in part using the measured control value.

16 Claims, 2 Drawing Sheets

VIBRATION WELDING SYSTEM WITH THIN FILM SENSOR

STATEMENT REGARDING FEDERALLY SPONSORED RESEARCH OR DEVELOPMENT

This invention was made with the support of the United States Government under an Agreement/Project DE-EE0002217, Department of Energy Recovery and Reinvestment Act of 2009, Battery Pack Manufacturing B511. The United States Government may have certain rights in this invention.

TECHNICAL FIELD

The present disclosure relates to a vibration welding system having one or more thin film sensors.

BACKGROUND

In a vibration welding process, adjacent surfaces of a clamped work piece are joined using high frequency vibration energy. Transmission of the vibration energy through the material of the clamped work piece creates friction and heat along interfacing work piece surfaces. The heat softens the interfacing surfaces, which are ultimately joined together upon cooling to form a welded joint.

A vibration welding system includes various interconnected welder devices. Primary in importance among the interconnected welder devices are a vibrating sonotrode/welding horn and an anvil assembly. The anvil assembly may include an anvil and a back plate, with the anvil being bolted or otherwise attached to a rigid support member via the back plate. The work piece is clamped between working surfaces of the horn and the anvil. The horn is then caused to vibrate at a calibrated frequency and amplitude in response to a high-frequency input signal from a welding controller/power supply.

SUMMARY

A vibration welding system is disclosed herein that uses at least one thin-film sensor in the control of the vibration welding process. The system includes an anvil, a welding horn, a thin film sensor or multiple such sensors, and a process controller. The anvil and welding horn have respective first and second working surfaces, i.e., surfaces that contact a clamped work piece during the vibration welding process. Each thin film sensor is positioned with respect to one of the working surfaces in the system. The sensor measures a control value at the working surface, for instance a temperature/heat flux value. The sensor transmits the measured control value to the process controller. The controller is configured to control the vibration welding system in part using the measured control value.

Additionally, an assembly for use in the vibration welding system includes a welder device having a working surface that contacts a work piece during a vibration welding process, at least one thin film sensor positioned with respect to the working surface, and a process controller in communication with the sensor(s). Each thin film sensor measures a control value at the working surface and transmits the measured control value to the process controller. The process controller then controls the vibration welding system in part using the measured control value.

A vibration welding method is also disclosed that includes providing a welder device with a slot or slots, each being adjacent to a working surface of the welder device. The method further includes inserting a thin film sensor into a corresponding one of the slots, and then using the inserted thin film sensor to measure a control value at the working surface. The method further includes transmitting the measured control value to a process controller, and thereafter controlling the vibration welding system in part using the measured control value.

The above features and advantages and other features and advantages of the present invention are readily apparent from the following detailed description of the best modes for carrying out the invention when taken in connection with the accompanying drawings.

DETAILED DESCRIPTION

Figure 1:
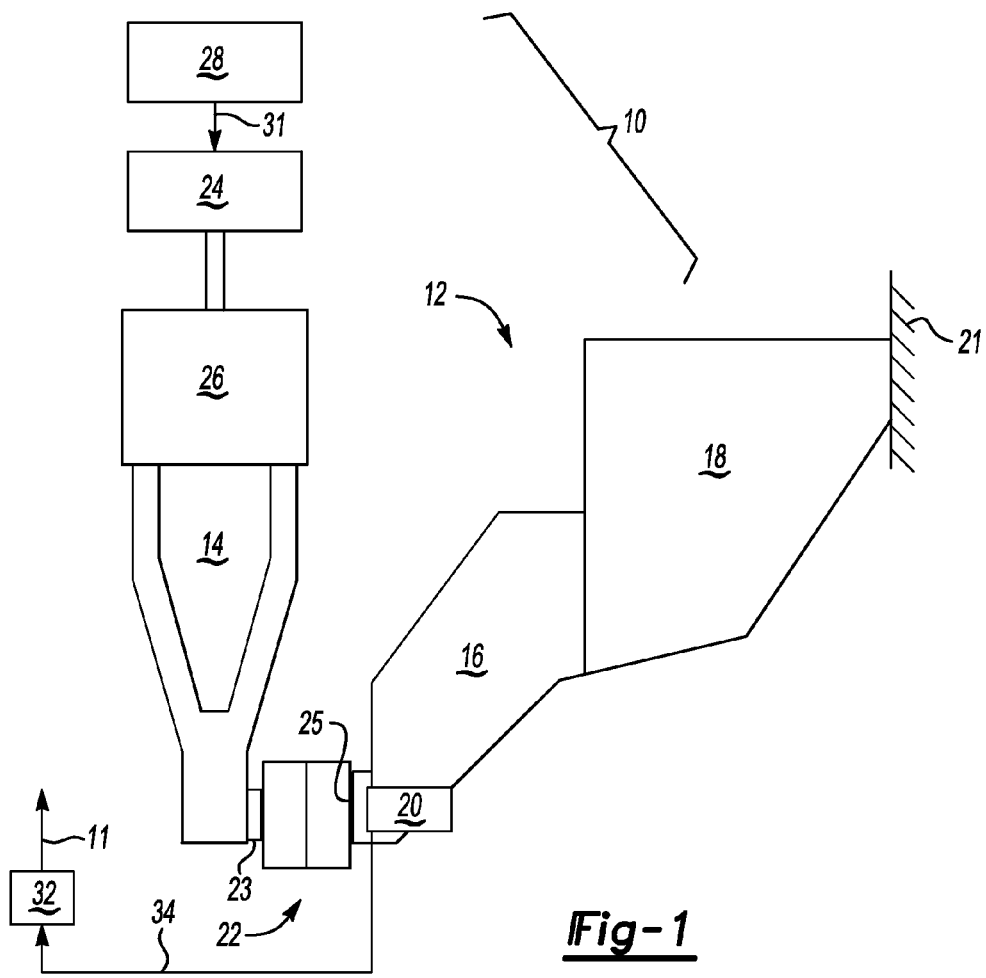
FIG. 1 is a schematic illustration of a vibration welding system using one or more thin film sensors as set forth herein.

Referring to the drawings, wherein like reference numbers refer to like components, an example vibration welding system 10 is shown in FIG. 1. The system 10 is configured to form welded joints in a work piece 22 using applied vibration energy in the ultrasonic or other suitable frequency ranges. The system 10 includes various interconnected welder devices, including at least an anvil assembly 12 and a vibrating sonotrode/welding horn 14. As set forth in detail below with reference to FIGS. 2 and 3, one or more of the welder devices used within the system 10 may be configured to receive a thin film sensor 20, which is shown schematically in FIG. 1. Overall control of the system 10 may be informed at least in part by control values (arrow 34) that are measured by the thin film sensor 20, or by multiple such sensors 20.

For example, each thin film sensor 20 may be embodied as a temperature/heat flux sensor. When configured in this manner, the thin film sensor 20 may include multiple thermocouples and/or thermopiles which collectively measure the welding temperature and associated heat flux in proximity to a welded joint as the welded joint is being formed in the work piece 22. Such measurements may be taken and used in conjunction with overall process monitoring, control, and preventive maintenance. Various options for inserting and/or attaching the thin film sensors 20 are described below with reference to FIGS. 2 and 3, while an example sensor layout for the thin film sensor 20 is described with reference to FIG. 4.

In general, the thin film sensor 20 used herein may be configured as a micro-electromechanical system (MEMS) sensor. As is well known in the art, MEMS sensors may be fabricated on thin wafers of a conductive substrate using, for instance, low-pressure chemical vapor deposition, photolithography, masking, or other fabrication steps. The thin film sensor 20 may be any commercially available MEMS sensor such as a photonic device in the form of, e.g., a micro ring or a nanophotonic crystal resonator.

The anvil assembly 12 shown in FIG. 1 may include an anvil 16 and a back plate 18. The anvil 16 may be connected to the back plate 18 and a support member 21. As a whole, the anvil assembly 12 provides a relatively stiff mass of metal that is positioned opposite the welding horn 14 during the vibration welding process.

The welding horn 14 may include a welding pad 23. The welding pad 23 may form a working surface having knurl patterns, e.g., in the form of raised bumps, ridges, or any other textured pattern providing sufficient traction for gripping the work piece 22. The anvil 16 may include a textured working surface 25 having a similar knurl pattern. The welding pad 23 and the textured working surface 25 together facilitate the secure gripping of the work piece 22 during the vibration welding process.

Additional welder devices may be used within the system 10 of FIG. 1. For example, to properly drive and control the ultrasonic welding process, a welding power supply 28 may be used to transform available source power into a form that is more conducive to vibration welding. The power supply 28 can be electrically-connected to any suitable energy source, e.g., a 50-60 Hz AC wall socket. In this instance, the power supply 28 may include the required voltage rectifiers and inverters for generating a high-frequency waveform suitable for vibration welding. The power supply 28 of FIG. 1 ultimately transforms source power into a suitable power control signal having a predetermined waveform characteristic(s) suited for use in the vibration welding process, for example a frequency of several Hertz (Hz) to about 40 KHz, or higher frequencies depending on the particular application.

Additional welder devices may include a converter 24 and a booster 26. The converter 24 may be a piezoelectric stack or any other structural element having the required mechanical structure for producing a mechanical vibration in response to an input signal (arrow 31) from the power supply 28. The booster 26 amplifies the amplitude of vibration of the input signal (arrow 31), and/or changes a direction of an applied clamping force between the welding horn 14 and the anvil 16.

Still referring to FIG. 1, the vibration welding system 10 may include a process controller 32 that is in communication with the thin film sensor(s) 20. The controller 32 receives the measured control values (arrow 34) from each thin film sensor 20 used as part of the system 10, and then processes the received control values (arrow 34) for use in the overall control of the vibration welding process. An output signal (arrow 11) from the controller 32 may be used for this purpose.

An example method may include receiving temperature and heat flux measurements as the control values (arrow 34) from the thin film sensor 20, or from multiple such sensors 20, and then using the process controller 32 to compare the received control values (arrow 34) to calibrated values or ranges. The process controller 32 may then determine the weld quality in real-time, i.e., while the welded joint is being formed, or offline, based on the results of such a comparison.

The measured control values (arrow 34) may be compared to calibrated thresholds in one embodiment, while pattern recognition of heat flux and/or temperature spikes may be performed using neural networks or other artificial intelligence to determine the weld quality in another possible embodiment. Likewise, the measured control values (arrow 34) may be recorded and correlated over time with tool wear, such as any wear of the knurl pattern on the textured working surface 25 or the welding pads 23, to signal, possibly in real time, the need for possible tool repair/replacement. The output signal (arrow 11) may be used, for instance, to record a diagnostic code, signal an indicator device (not shown), or change a control variable of the power supply 28.

Figure 2:
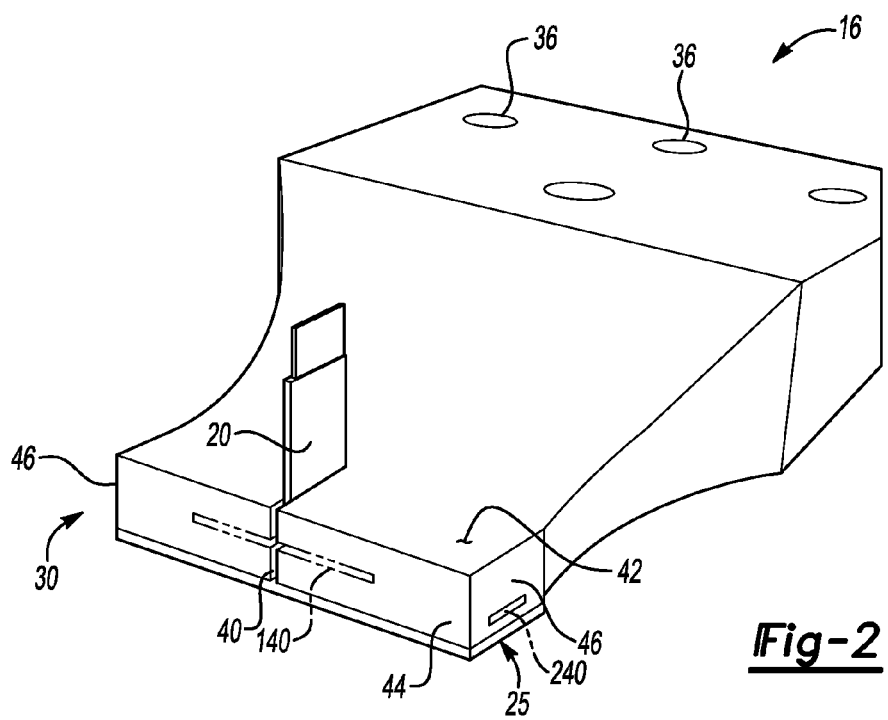
FIG. 2 is a schematic perspective view illustration of an example welding anvil that is usable with the vibration welding system of FIG. 1.

Referring to FIG. 2, the anvil 16 is shown in a possible configuration. The thin film sensor 20 may be inserted into the anvil 16 immediately adjacent to the textured working surface 25 (also see FIG. 3). While those of ordinary skill in the art will appreciate that the thin film sensor(s) 20 may be inserted into other welder devices, such as the welding horn 14 of FIG. 1 adjacent to the welding pads 23, insertion of the thin film sensor 20 with respect to the anvil 16 will be described hereinafter for illustrative consistency.

A distal end 30 of the anvil 16 includes the textured working surface 25, which may be framed by a longitudinal side wall 44 and a pair of lateral side walls 46 of the anvil 16 as shown. The undersurface 42 of the anvil 16 is the particular major surface facing away from the work piece 22 of FIG. 1 when the work piece 22 is clamped between the anvil 16 and the welding horn 14. Fasteners (not shown) may be inserted into a set of bolt holes 36 to rigidly fasten the anvil 16 to the back plate 18 shown in FIG. 1.

A slot 40 may be provided on the undersurface 42 of the anvil 14, with the thin film sensor 20 orthogonally arranged with respect to the longitudinal side wall 44 in the example configuration shown in FIG. 1. The anvil 16 of FIG. 1, or any other welder device of the system 10 shown in the same Figure, may be cut via laser or other means to form the slot 40, with the thin film sensor 20 then inserted into the slot 40. Alternatively, the anvil 16 may be cut into two separate portions, after which the thin sensors 20 may be inserted between the portions. Thereafter, the anvil 16 may be bonded or fastened back together such that the thin film sensor 20 is trapped between the portions. The slot 40 should be sized slightly larger than the thickness of the thin film sensor 20, typically on the order of less than 2 mm, so that a sufficient interference fit exists between the anvil 16 and the thin film sensor 20 after insertion.

The orientation of the slot 40 shown in FIG. 2 may be varied depending on the application. For instance, optional slots 140 as shown in phantom may be provided in the longitudinal side wall 44 that are parallel to the longitudinal axis of the side wall 44. Another slot 240 may be likewise formed in any direction in the lateral side wall 46 to receive a thin film sensor 20 at that location without departing from the intended inventive scope.

Figure 3:
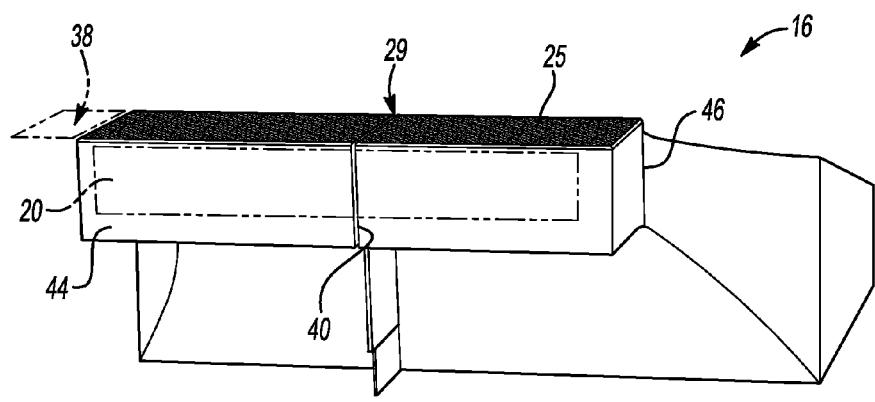
FIG. 3 is another schematic perspective view illustration of the welding anvil shown in FIG. 2.

Referring to FIG. 3, the anvil 16 of FIG. 2 is shown from the side of the working surface 25. When the thin film sensor 20 is fully inserted into the slot 40 or any of the different possible embodiments of the slot 40, an end 29 of the thin film sensor 20 may be positioned immediately adjacent to the textured working surface 25. Because the working surface 25 includes knurls which directly contact the work piece 22 of FIG. 1, tremendous vibration energy is present along the plane 38 of the working surface 25. The thin film sensor 20 should therefore be positioned a suitable distance below the plane 38, for example about 1 mm or less. That is, the thin film sensor 20 should be positioned as close as possible to the working surface 25, or to any other surface whose temperature and heat flux are being measured as control values, but not so close as to be damaged during the welding process.

In an alternative embodiment, the thin film sensor 20 may be adhered to the anvil 16 rather than inserted therein. One possible location for such adherence is the longitudinal side wall 44 as shown in phantom, or alternatively the lateral side wall 46. Because acceleration forces can be extreme at the working surface 25, the bonding strength of any adhesive used in such an approach is critical. Silver paste, for instance, may suffice as an adhesive material in typical ultrasonic welding applications.

Figure 4:
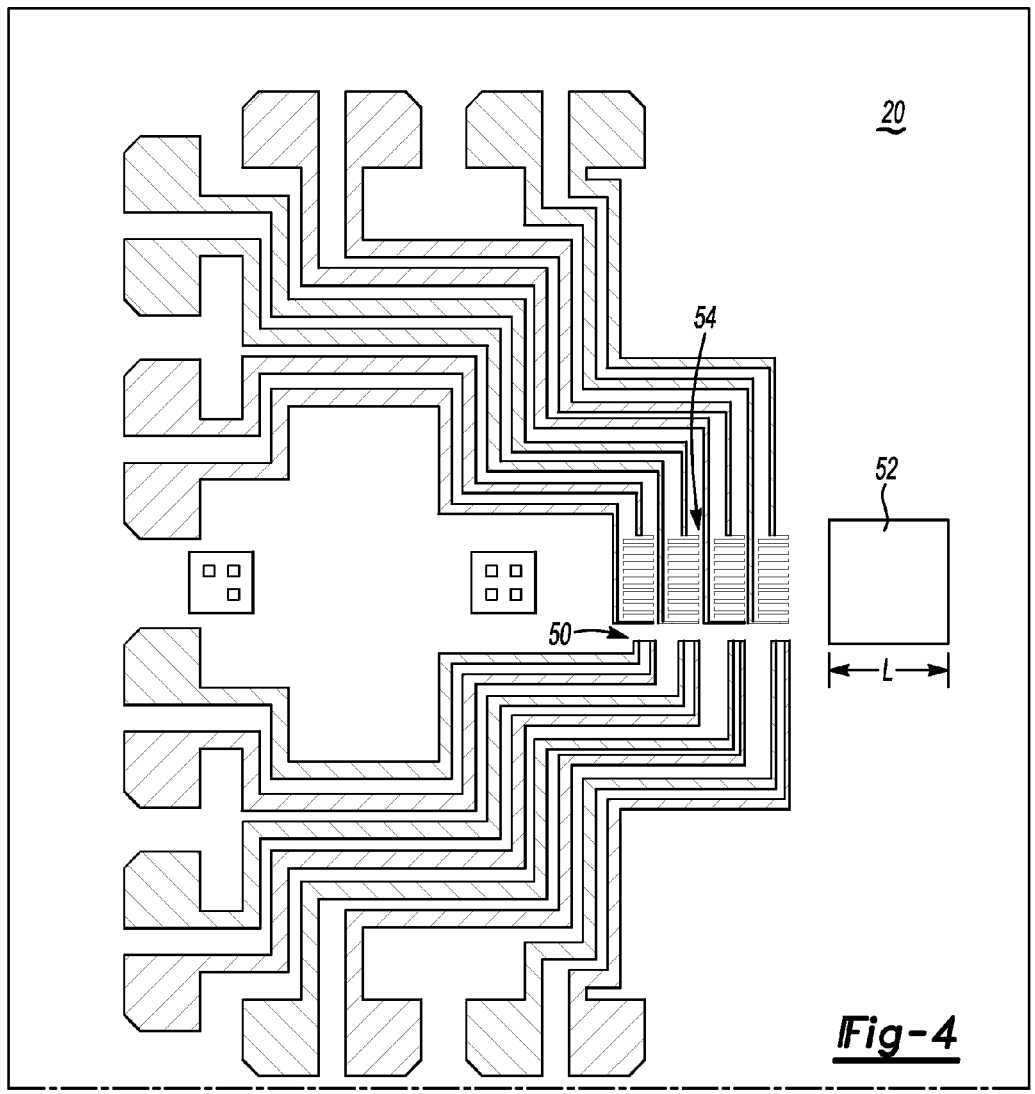
FIG. 4 is a schematic illustration of an example sensor layout for a thin film sensor usable within the vibration welding system of FIG. 1.

Referring to FIG. 4, an example layout is provided for a portion of a thin film sensor. Among many possible uses, the vibration welding system 10 of FIG. 1 may be used to form a welded joint in a vehicle battery. Such welded joints are formed on conductive battery tabs and are approximately 3 mm to 4 mm on a given side.

Thus, in such an application the thin film sensor 20 may include a plurality of thermopiles 50 and a plurality of thermocouples 54. The thermopiles 50 and thermocouples 54 may be arranged as shown to measure temperature and heat flux at the locus of the welding zone, with the locus indicated generally by area 52. In this example embodiment, the thermopiles 50 and thermocouples 54 may be positioned about 1 mm to 2 mm apart from each other for a generally square welding zone of approximately 3 mm. Use of four thermopiles 50 is merely illustrative. Fewer or more thermopiles 50 may be used, and these may be oriented in a different manner than that shown.

Using the vibration welding system 10 described above, a vibration welding process may be readily envisioned that uses one of more of the thin film sensors 20 shown in FIGS. 1-4 in a feedback loop with the process controller 32 shown in FIG. 1. The measured control value (arrow 34 of FIG. 1) from each inserted thin film sensor 20 can then be used by the process controller 32 to determine, for instance in real-time during formation of the welded joint, the quality of the weld. Various control actions may be taken by the process controller 32, such as changing an input variable to the power supply 28 of FIG. 1, e.g., vibration frequency, amplitude, clamping force, etc. Alternatively, the process controller 32 of FIG. 1 may designate a weld as good or bad in real time in response to the measured control value (arrow 34). Such an approach may be advantageous in the welding of conductive battery tabs and in the ultrasonic welding of other welded products. These and other possible control actions will be readily appreciated by those having ordinary skill in the art.

While the best modes for carrying out the invention have been described in detail, those familiar with the art to which this invention relates will recognize various alternative designs and embodiments for practicing the invention within the scope of the appended claims.

The invention claimed is:

1. A vibration welding system comprising:
   a process controller that is configured to control the vibration welding system in part using a measured control value;
   an anvil having a first textured working surface;
   a welding horn having a textured welding pad with a second textured working surface, wherein the anvil and the welding horn are configured to clamp a work piece between the first and second textured working surfaces during a vibration welding process; and
   a thin film sensor that includes a plurality of thermopiles in communication with the process controller, wherein:
      the thin film sensor is positioned immediately adjacent to a designated one of the first and second textured working surfaces;
      the thin film sensor is configured to measure a temperature value as the measured control value with respect to the designated first or second textured working surface, and to transmit the measured control value to the process controller; and
      the controller is configured to:
         determine heat flux values of the first or second textured working surface using the measured control value as a weld is being formed;
         compare the determined heat flux values to calibrated heat flux values or ranges of heat flux values; and
         execute a control action with respect to the vibration welding system when the determined heat flux values match the calibrated heat flux values or ranges of heat flux values, including determining whether the first or second textured working surface is substantially worn and requires repair or replacement, and recording a diagnostic code requesting the repair or replacement.

2. The system of claim 1, wherein the thin film sensor also includes a plurality of thermocouples.

3. The system of claim 2, wherein the thin film sensor is one of a micro ring sensor and a nanophotonic crystal resonator.

4. The system of claim 1, wherein:
   the thin film sensor is positioned within a slot defined by the anvil adjacent to the textured working surface of the anvil.

5. The system of claim 4, wherein the slot is parallel to a longitudinal axis of a longitudinal side wall of the anvil.

6. The system of claim 4, wherein the slot is orthogonally arranged with respect to a longitudinal axis of a longitudinal side wall of the anvil.

7. The system of claim 1, wherein the thin film sensor is adhered to one of a longitudinal side wall and a lateral side wall of the anvil using an adhesive material.

8. The system of claim 7, wherein the adhesive material is silver paste.

9. An assembly for use in a vibration welding system, the assembly comprising:
   a welder device having a textured working surface that contacts a work piece during a vibration welding process;
   a thin film sensor that is positioned immediately adjacent to the textured working surface, and that includes a plurality of thermopiles; and
   a process controller in communication with the thin film sensor;
   wherein the thin film sensor is configured to measure heat flux values of the textured working surface as a control value from a position adjacent to the textured working surface, and to transmit the measured control value to the process controller, and wherein the process controller is configured to:
      receive the measured heat flux values of the textured working surface using the measured control value as a weld is being formed;
      compare the determined heat flux values to calibrated heat flux values or ranges of heat flux values; and
      execute a control action with respect to the vibration welding system when the received heat flux values match the calibrated heat flux values or ranges of heat flux values, including determining, as the executed control action, whether the textured working surface is substantially worn and requires repair or replacement, and then recording a diagnostic code requesting the repair or replacement.

10. The assembly of claim 9, wherein the welder device is a welding anvil.

11. The assembly of claim 10, wherein the thin film sensor includes a plurality of thermocouple pairs collectively configured, with the plurality of thermopiles, to measure welding temperature and the heat flux value.

12. The assembly of claim 9, wherein the welder device defines a slot that receives the thin film sensor.

13. The assembly of claim 12, wherein the slot is parallel to a longitudinal axis of a side wall of the welder device.

14. The assembly of claim 12, wherein the slot is orthogonal with respect to a longitudinal axis of a side wall of the welder device.

15. The assembly of claim 9, wherein the thin film sensor is adhered to a side wall of the welder device using an adhesive material.

16. The assembly of claim 15, wherein the adhesive material is silver paste.

* * * * *